(12) United States Patent
Knight

(10) Patent No.: US 7,797,404 B1
(45) Date of Patent: Sep. 14, 2010

(54) AUTOMATIC SERVER CONFIGURATION USING A STORAGE CONFIGURATION DATABASE

(75) Inventor: Margaret E. Knight, Seattle, WA (US)

(73) Assignee: Symantec Operting Corporation, Mountain View, CA (US)

( * ) Notice: Subject to any disclaimer, the term of this patent is extended or adjusted under 35 U.S.C. 154(b) by 2047 days.

(21) Appl. No.: 10/305,651

(22) Filed: Nov. 27, 2002

(51) Int. Cl.
*G06F 15/177* (2006.01)

(52) U.S. Cl. ............... 709/220; 709/221; 709/222; 709/223

(58) Field of Classification Search ............ 709/220, 709/223, 224, 221, 22, 222
See application file for complete search history.

(56) References Cited

U.S. PATENT DOCUMENTS

| | | | |
|---|---|---|---|
| 6,199,110 B1* | 3/2001 | Rizvi et al. ............... 709/227 |
| 6,311,232 B1* | 10/2001 | Cagle et al. ............... 710/8 |
| 6,347,366 B1 | 2/2002 | Cousins | |
| 6,490,610 B1* | 12/2002 | Rizvi et al. ............... 718/101 |
| 6,519,679 B2 | 2/2003 | Devireddy et al. | |
| 6,538,669 B1 | 3/2003 | Lagueux, Jr. et al. | |
| 6,629,158 B1 | 9/2003 | Brant et al. | |
| 6,654,797 B1 | 11/2003 | Kamper | |
| 6,654,891 B1* | 11/2003 | Borsato et al. ............... 726/6 |
| 6,751,739 B1 | 6/2004 | Verdun | |
| 2002/0129216 A1 | 9/2002 | Collins | |
| 2002/0133539 A1* | 9/2002 | Monday ............... 709/203 |
| 2002/0174331 A1* | 11/2002 | Nock et al. ............... 713/100 |
| 2003/0004952 A1* | 1/2003 | Nixon et al. ............... 707/10 |
| 2003/0046270 A1 | 3/2003 | Leung et al. | |
| 2003/0065902 A1* | 4/2003 | Shiga et al. ............... 711/170 |
| 2003/0179867 A1* | 9/2003 | Piepho et al. ............... 379/90.01 |
| 2003/0208581 A1* | 11/2003 | Behren et al. ............... 709/223 |
| 2003/0208589 A1* | 11/2003 | Yamamoto ............... 709/224 |
| 2003/0225867 A1* | 12/2003 | Wedlake ............... 709/222 |
| 2004/0006612 A1* | 1/2004 | Jibbe et al. ............... 709/223 |
| 2004/0010600 A1* | 1/2004 | Baldwin et al. ............... 709/229 |
| 2004/0201604 A1* | 10/2004 | Kraenzel et al. ............... 345/700 |
| 2008/0126704 A1* | 5/2008 | Ulrich et al. ............... 711/114 |

OTHER PUBLICATIONS

Compaq Computer Corporation, "Performance and Capacity Planning Solution," 1999.
U.S. Appl. No. 10/388,193, filed Mar. 2003, Knight.

* cited by examiner

*Primary Examiner*—John Follansbee
*Assistant Examiner*—Nghi V Tran
(74) *Attorney, Agent, or Firm*—Meyertons Hood Kivlin Kowert & Goetzel, P.C.; Jeffrey C. Hood

(57) ABSTRACT

A method for configuring a new server with a server configuration, such as a storage configuration, backup configuration, etc. The method may automatically detect presence of a new server coupled to a network and then automatically determine one or more attributes, such as available storage, of the new server. The method may then automatically determine one or more server configurations for the new server. For example, software may examine existing server configurations stored in a repository or database to determine if one or more of the existing server configurations are usable for configuring the server, e.g., based at least in part on the determined attributes of the new server. If the user accepts a server configuration, software may then operate to automatically configure the new server accordingly. Embodiments are included for adding server configurations to the repository. A global server configuration repository is also contemplated.

32 Claims, 4 Drawing Sheets

AUTOMATIC SERVER CONFIGURATION USING A STORAGE CONFIGURATION DATABASE

BACKGROUND

1. Field of the Invention

This invention generally relates to generating storage configurations for servers.

2. Description of the Related Art

Network administrators are required to perform many various types of tasks in setting up and running a network. One common task performed by a network to administrator is creating a storage configuration, e.g., setting up and configuring storage on a server. Network administrators are required to create storage configurations for various applications, including Microsoft Outlook, SQL databases, etc.

On a large network, a given company may add many Exchange and/or SQL servers over time. Configuring all of the various volumes and data objects on new or existing servers requires significant expertise and a large amount of administrator time. In general, the creation of a storage configuration for an application many times is a difficult and complicated task. Therefore, it would be greatly desirable to provide a process which allows the user to the more easily create and apply a storage configuration to one or more computer systems.

SUMMARY OF THE INVENTION

One embodiment of the invention comprises a system and method for configuring a new server with a server configuration. The server configuration may be a storage configuration, backup configuration or other type of configuration for a computer system.

The method may comprise first automatically detecting presence of a new server coupled to a network. For example, an administrator may add or couple a new server to the network, and this new server may be automatically detected by software. The method may then automatically determine one or more attributes of the new server. For example, software may automatically determine available storage of the new server, among other possible server attributes.

The method may then automatically determine one or more server configurations for the new server. For example, software may examine one or more existing server configurations stored in a repository or database to determine if one or more of the existing server configurations are usable for configuring the server. In one embodiment, the repository is the Microsoft Active Directory. The repository may be located on the same local area network as the new server, or may be located at a remote location and accessible through a wide area network, such as the Internet. The examination of the existing server configurations may be based at least in part on the determined attributes of the new server.

The determined server configurations may then be usable in configuring the new server. For example, the method may display the determined server configuration(s) for the new server on a display, such as in a graphical user interface element. Alternatively, the method may generate a notification to a user of the determined server configurations, such as by email. The administrator or user may view the determined server configurations and provide user input selecting a server configuration. Software may then operate to automatically configure the new server with the selected server configuration.

If the user declines use of any of the determined server configurations, in one embodiment the method automatically initiates a server configuration wizard program. The server configuration wizard program may be executable to guide the user through a configuration process to generate a server configuration.

Where the user creates a server configuration, such as by using a wizard or other means, in one embodiment the server configuration may be automatically archived or stored in the server configuration repository. Alternatively, the user may perform a simple registration process to register the server configuration with the server configuration repository or database.

Embodiments of the invention also contemplate a global server configuration repository or database that is accessible by a plurality of networks. The server configuration repository may be useable to store and provide server configurations for configuring new servers on various networks. Various users may register server configurations with the database, and users may browse server configurations that have been previously registered. Also, software programs may automatically scan server configurations in the database to determine candidate server configurations for configuration of servers.

BRIEF DESCRIPTION OF THE DRAWINGS

A better understanding of the present invention can be obtained when the following detailed description of the preferred embodiment is considered in conjunction with the following drawings, in which.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the invention as defined by the appended claims.

DETAILED DESCRIPTION OF EMBODIMENTS

Incorporation by Reference

U.S. provisional application Ser. No. 60/348,870 titled "Storage Configurator" filed on Jan. 14, 2002 is hereby incorporated by reference as though fully and completely set forth herein.

Figure 1:
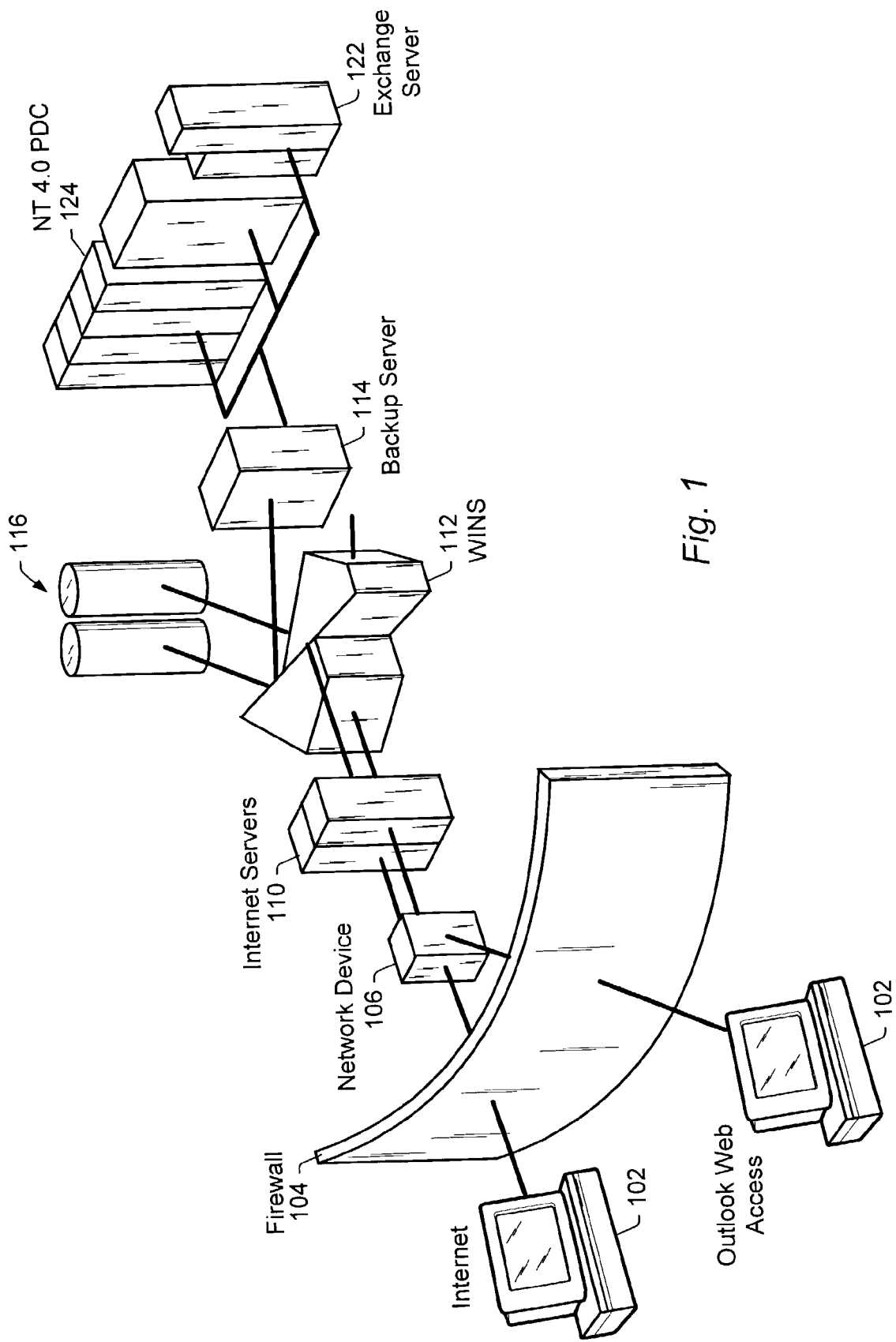
FIG. 1 illustrates an exemplary network system according to one embodiment.

FIG. 1—Exemplary Network System

FIG. 1 illustrates an exemplary network system according to one embodiment. Embodiments of the invention may be used in any of various types of computer systems, network systems, or enterprise systems, and FIG. 1 illustrates one example of a network system. The network system may be a local area network (LAN), two or more interconnected local area networks, or a wide area network (WAN) comprising two or more distributed LANs coupled together, such as by the Internet, among other possible configurations.

As shown, the network system may include one or more client computer systems 102. The client computer systems 102 may store and/or execute various applications, one example being an electronic mail (email) or electronic contact/scheduling client program, such as Microsoft Outlook. The client computer systems 102 may execute other applications, such as programs for Internet access, database programs, network management, and others. The one or more client computer systems 102 may connected through a firewall 104 to a network device 106, such as a router, hub, or bridge. The client computer systems 102 may couple through the firewall 104 and/or network device 106 to one or more Internet servers 110. The Internet servers 110 may be connected to various other computer systems and/or storage devices, such as a WINS server 112, a backup server 114, and/or a storage area network (SAN) 116. These servers may in turn be connected to other servers which host other applications, such as Microsoft Exchange server 122 or NT 4.0 PDC (Primary Domain Controller) 124, among others.

For many network systems, a network administrator or other person may be required to configure storage of one or more computer systems, e.g., one or more server computers, for various applications. For example, a network administrator may be required to configure or create a storage configuration for applications such as Microsoft Exchange, SQL databases, and various other applications. As one specific example, a network administrator may purchase a new server for Microsoft Exchange, and may need to configure the new server with a storage configuration for Exchange. As noted above, current prior art solutions require the network administrator to manually create a storage configuration. However, creation of a storage configuration is a complicated and difficult task and typically requires significant expertise on the part of the network administrator.

As used herein, the term "storage configuration" refers to a configuration applied to a computer, such as a server, to configure a storage layout on the computer. For example, a storage configuration may specify the number and type of volumes and data objects applied to the memory of a computer system. The terms "storage layout" and "storage configuration" may be used interchangeably.

As used herein, the term "server configuration" refers to any of various types of configurations that could be applied to a server, including a storage configuration as described above, a backup configuration, a file server configuration, a network management configuration, an imaging configuration, etc.

One embodiment of the present invention comprises a software program (or programs), executable on at least one computer system in the network system of FIG. 1, which operates to programmatically or automatically determine an existing server configuration, e.g., an existing server configuration that has been stored in a repository, and apply this existing server configuration to a new server. These one or more software programs that programmatically or automatically determine an existing server configuration and apply this existing server configuration to a new server may be referred to as Server Configuration Replication software ("SCR software"). Thus, one embodiment of the invention operates to automate the process of replicating server configurations onto new servers. Embodiments of the invention also operate to simplify the process of setting up new unique servers as well.

Embodiments of the present invention operate to greatly simplify the task of the network administrator in determining and creating storage configurations or storage layouts for a network system.

In various embodiments, the Server Configuration Replication software ("SCR software") may be stored in various locations, such as on a memory medium of one or more of the client computer systems 102, a memory medium of one or more of the server computers 110, 112, 114, 116, 122 and/or 124, or a separate dedicated computer system, or combinations thereof. The SCR software program may also execute on any of various of the computer systems. In one embodiment, the SCR software program may be stored in a client computer system 102 used by the network administrator for system configuration and management. In another embodiment, the SCR software program may be stored in a server computer system, such as any of servers 110, 112, 114, 116, 122 and/or 124. In another embodiment, portions of the SCR software may be stored on a plurality of different computers, and the software may execute in a distributed manner.

In one embodiment, one or more of the computer systems in FIG. 1 includes a server configuration repository or database for storing existing server configurations. The server configuration repository or database may be stored in various locations, such as on a memory medium of one or more of the client computer systems 102, a memory medium of one or more of the server computers 110, 112, 114, 116, 122 and/or 124, a separate dedicated computer system, or combinations thereof. In one embodiment, as discussed with respect to FIG. 2, the server that stores existing server configurations, e.g., that stores a repository or database of existing server configurations, is separate from the network system where the new server is being added.

The term "memory medium" is intended to include any of various types of memory devices for storing programs and/or data. For example, the term "memory medium" is intended to include an installation medium, e.g., a CD-ROM, floppy disks 104, or tape device; a computer system memory or random access memory such as DRAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution.

The SCR software program(s) which implement embodiments of the present invention may be stored in one or more memory mediums of one of the computers shown in FIG. 1, or in a memory medium of another computer, and executed by one or more CPUs. One or more CPUs executing code and data from a memory medium thus may comprise a means for performing the methods described herein. For example, a CPU executing code and data from a memory medium may comprise a means for automatically determining and replicating a server configuration according to the methods described herein.

Various embodiments may further include receiving, sending or storing instructions and/or data that implement server configuration replication in accordance with the present description upon a carrier medium. Generally speaking, a carrier medium may include a memory medium as defined above, as well as transmission media or signals such as electrical, electromagnetic, or digital signals, conveyed via a communication medium such as network and/or a wireless link.

In general, the term computer system as used herein is defined to encompass any device having a processor which executes instructions from a memory medium. In different embodiments, a "computer system" may take various forms, including a personal computer system, desktop computer, mainframe computer system, server computer system, personal digital assistant, another suitable device, or combinations thereof. A computer system may be attached to a network as part of a distributed computing environment.

In the present application, the term "automatically" or "programmatically" means that the associated operation is performed by software executing on a computer, possibly with some information input by the user, and the associated operation is not performed manually by a user.

Figure 2:
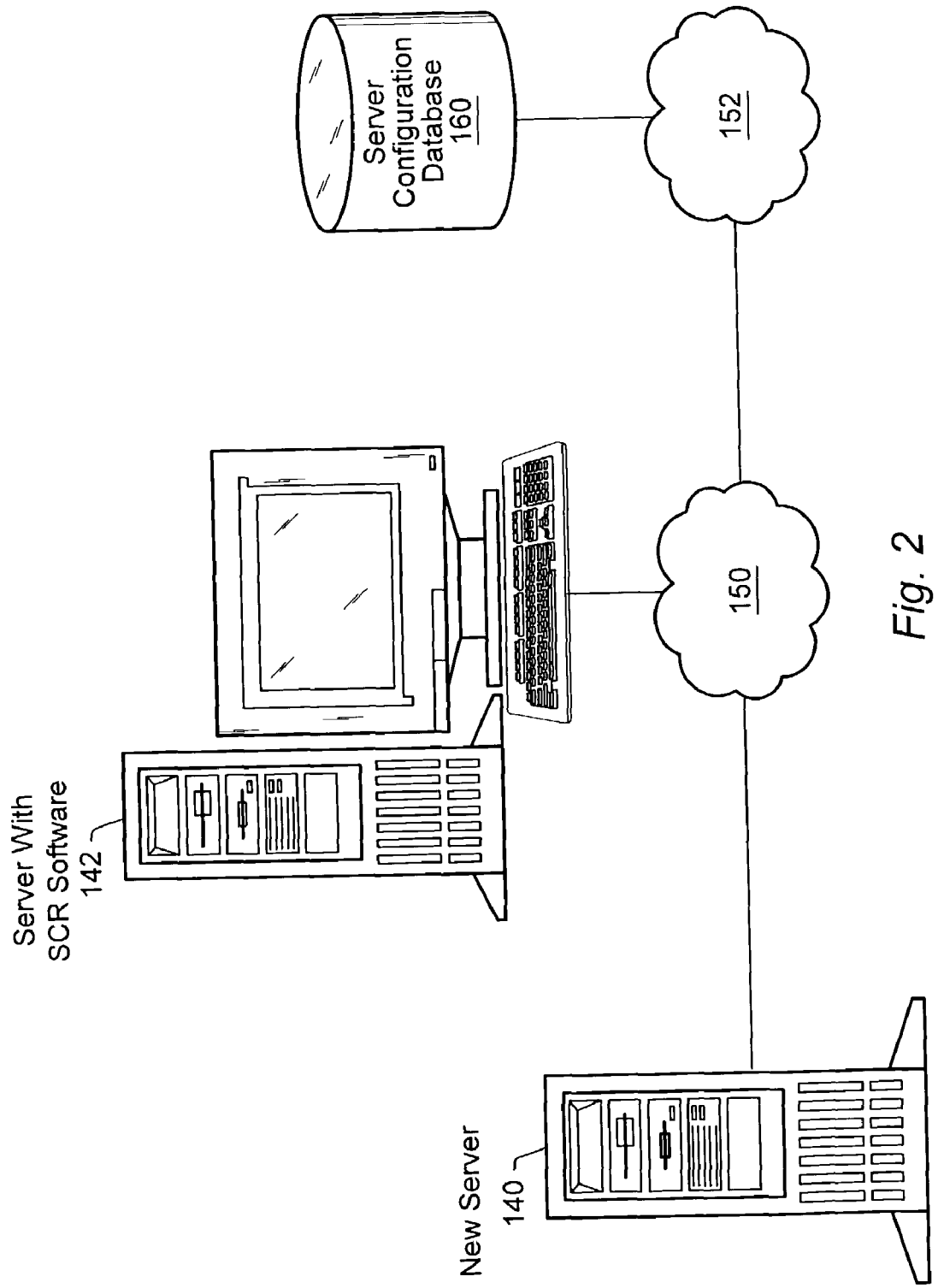
FIG. 2 illustrates an exemplary network system coupled to a server configuration database according to one embodiment.

FIG. 2—An Exemplary System Including a Server Configuration Database

FIG. 2 illustrates an exemplary system for operating a server configuration database, according to one embodiment. FIG. 2 shows a simple network system comprising a network 150 and a computer system 142 which stores and/or executes the SCR software. The computer system 142 may be any of the computer systems shown in FIG. 1, or may be another computer system. FIG. 2 also shows a new server 140 being added to the network 150. In one embodiment, the network 150 may couple to a second network 152, e.g., over a wide area network, such as over the Internet. The networks 150 and 152 may be of one or more of the following: WAN, Internet, Ethernet, wireless, and/or LAN, among others.

The second network 152 may include a server configuration repository or database 160. The server configuration database 160 may include a database implemented in a computer system, or in a plurality of computer systems. For example, in one embodiment, the server configuration database 160 may be stored in a single server computer system. In another embodiment, the server configuration database 160 may use a distributed database model. In one embodiment, the server configuration database 160 may store a plurality of server configurations for a plurality of different types of servers and/or applications, possibly from a plurality of different manufacturers.

The computer 142 may be operable to determine presence of new server 140. The computer 152 may then be operable to access the server configuration database 160 over the networks 150 and 152 and search the server configuration database 160 for possible server configurations. This operation is described in more detail with respect to FIG. 3.

The computer 142 may be further operable to access the server configuration database 160 over the networks 150 and 152 and register a server configuration in the server configuration database 160. For example, if the administrator manually configures a server configuration on new server 140, the administrator may choose to register this new server configuration with the server configuration database 160. Alternatively, new server configurations may be automatically archived or stored in the server configuration database 160. After registration, the new server configuration may be available for use in configuring other servers. In one embodiment, the new server configuration may be available to any network that has access to the server configuration database 160.

Figure 3:
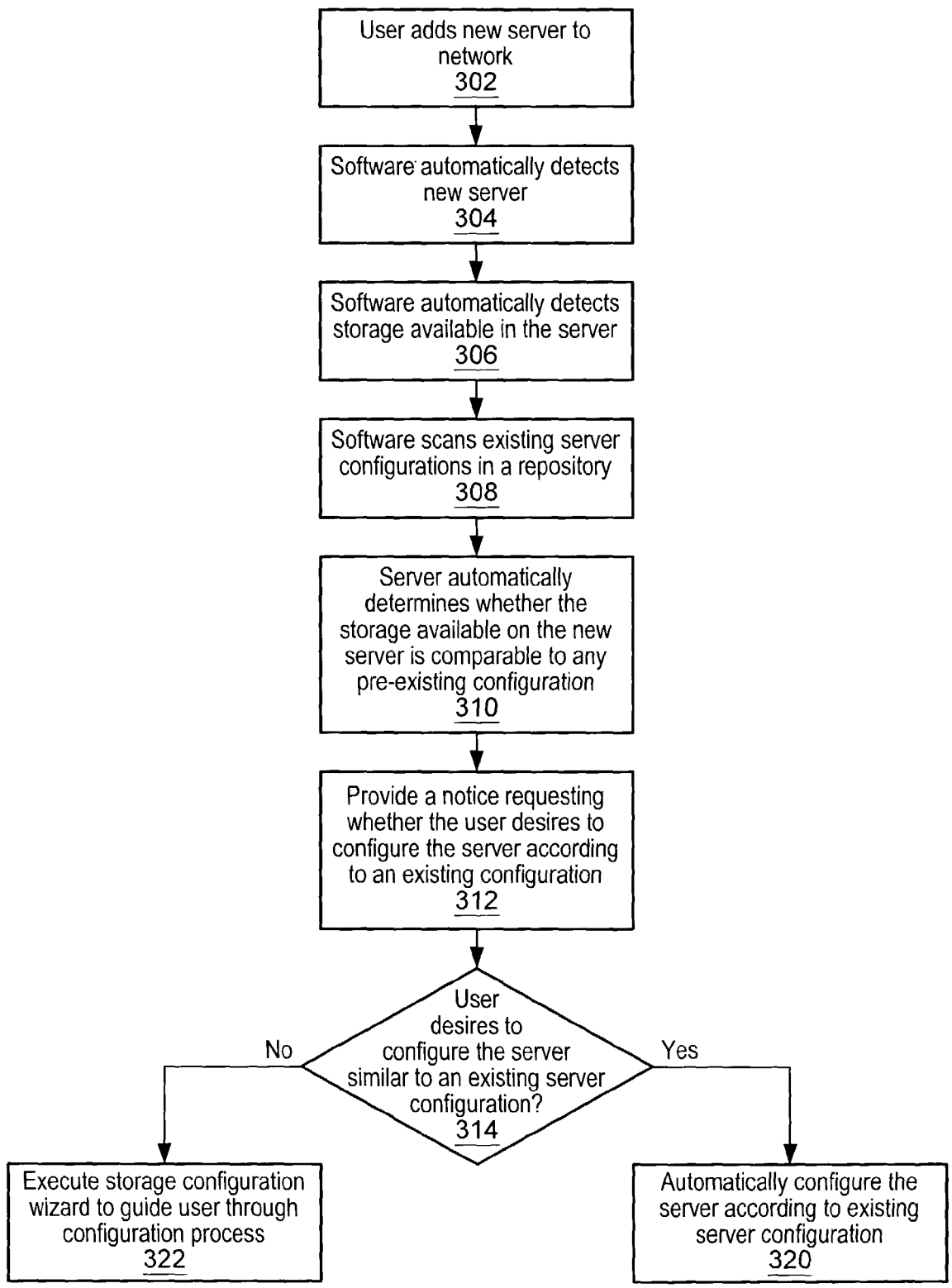
FIG. 3 is a flowchart diagram illustrating one embodiment of a method for configuring a server with an existing server configuration.

FIG. 3—Flowchart Diagram of Determining and Replicating a Server Configuration

FIG. 3 is a flowchart diagram illustrating one embodiment of operation of the present invention. It is noted that various of the steps shown in the flowchart of FIG. 3 may occur concurrently and/or in different orders than that shown. Further, various steps in the flowchart of FIG. 3 may be omitted, and/or various steps added, as desired. The steps in the flowchart of FIG. 3 may be performed by the SCR software referred to above.

As shown, in step 302 the user (e.g., an administrator) adds a new server to the network. The new server added to the network may be a file server, email server, backup server, imaging server, or any of various other types of servers or computer systems. As one example, the server may be primarily used for storage and may be added to a storage area network (SAN). For example, the user may desire to add a new server to the network system of FIG. 1 or 2. The user may add a new server by physically connecting the new server to the network, as known in the art.

In step 304 a software program executing on another computer system or server in the network (or possibly on a different network) automatically detects the presence of the new server. In one embodiment, the software which automatically detects the new server is the Active Directory Software available from Microsoft Corporation. Other methods for automatically detecting the presence of a new server are also contemplated. In one embodiment, the user manually specifies that a new server has been added to the system, e.g., by providing information to a GUI of the SCR software.

In step 306 the software program automatically detects one or more attributes of the new server. The attributes detected may include the amount of available storage, number and speed of processors, network bandwidth, etc. In one embodiment, the software program automatically detects the amount of storage available in the server. The detection of the storage available in the server is preferably performed by any of various software programs. In one embodiment, the detection of the storage available in the server is performed by Active Directory Software. In one embodiment, the user manually specifies the amount of storage available in the new server, e.g., by providing this information to a GUI of the software.

In step 308 the software program scans existing server configurations to attempt to determine one or more existing server configurations that can be used in configuring the new server that was added to the network in step 302. In one embodiment, one or more server configurations can be archived in a repository or database. In one embodiment, the repository is the Active Directory from Microsoft. In step 308 the software scans through these archived server configurations to determine one or more configurations that appear to match the storage available on the new server as determined in step 306. The matching criteria may be any of various types of criteria or metrics, such as an approximate match in the amount of available space, etc.

In one embodiment, in step 308 the software scans only existing server configurations that have been archived or stored in the local area network in which the new server has been added. In another embodiment, as described above with respect to FIG. 2, the software is operable to scan for server configurations stored or present on servers coupled to other networks. For example, a storage configuration company such as Veritas, Microsoft, etc. may store various pre-configured or stock server configurations, or server configurations previously registered by other users, at a predetermined location, e.g., in database or repository 160. In this embodiment, the software may operate to automatically connect through a wide-area network, such as the Internet, to the computer system database or repository which stores these server configurations and search these server configurations for possible solutions. The various server configurations may be searchable by keyword or other means. In one embodiment, users may be able to register server configurations with the database or repository for use by other users.

In yet another embodiment, the software may be operable to scan a number of different databases at various locations and maintained by various companies to attempt to find a server configuration which is most appropriate for the new server added to the network. For example, the search for possible server configurations may be dependent on the vendor of the new server, the available amount of memory in the new server and possibly other criteria, including user specified criteria. For example, the user who has added the new server to the network may determine the appropriate databases to search for possible server configurations.

In yet another embodiment, in step 308 the software may operate to automatically connect or log on to the server configuration repository, and the user may be able to browse the repository for desired server configurations to apply. Browsing may be accomplished by examining textual and/or graphical descriptions of the respective server configurations.

In step 310 the software automatically determines whether the determined attributes of the new server are compatible with the server configurations found in step 308. For example, in step 310 the software may automatically determine if the storage available on the new server is comparable to the server configurations found in step 308. If one or more server configurations are found which are compatible or comparable with the detected attributes, e.g., available storage, on the new server, then operation proceeds to step 312. It is noted that steps 308 and 310 may be performed as a single step.

In step 312 the software may initiate a request or notification as to whether the user desires to configure the server according to the server configuration found in step 308 and 310.

In one embodiment, the software operates to display a graphical user interface element, such as a dialog box, or a textual message, which asks whether the user desires to use one of the existing server configurations. In an alternate embodiment, in step 312 the software operates to provide an electronic mail (email) to the user or administrator stating that one or more existing server configurations have been found that could be applied to the new server, and asking whether the user desires to apply one of the server configurations to the new server.

Where a single server configuration is identified or recommended, the server configuration may be displayed in the GUI element or email (or be accessible by a link in the email), along with an icon, such as an "OK" or "Accept" button, for the user to specify that the server configuration should be applied. Where multiple server configurations were found which are compatible with the new server, each of these multiple server configurations may be presented in the GUI element or email (or be accessible by links in the email). The server configurations may also be optionally ranked based on best to worst matches. Further, the server configurations may include associated information specifying the manner in which the various suggested server configurations match the storage available in the existing server, and possibly suggest one of the server configurations based on various criteria. The user may then optionally be able to select the desired server configuration to apply to the new server.

In the case of an email notification, the user may then reply with an appropriate response to initiate deployment of the found server configuration onto the new server. The email may include the server configuration, either in the body of the email, or the email may contain a link to the server configuration. The administrator can view the proposed server configuration and then reply to the email, e.g., with authorization to proceed with installation of the proposed configuration. In one embodiment, the email message includes an accept button, configured using HTML. The administrator can view the proposed server configuration and then click the Accept button in the email if the user desires to apply the proposed server configuration.

Various other methods may also be used to notify the user that an existing server configuration has been found and to request the user whether this existing server configuration should be deployed or not. For example, the message may appear via facsimile, telephonically, and/or using other communication mechanisms.

In one embodiment, the user is presented with a GUI which allows the user to manually change certain aspects of the existing server configuration. For example, the server configuration may be presented on a display in a graphical form, e.g., with GUI elements containing settings or parameter values of the configuration that can be modified by the user.

In another embodiment, the SCR software may operate to programmatically modify a found existing server configuration, based on information determined in step 306, and recommend this modified server configuration to the user.

If in step 314 the user provides input indicating a desire to configure the server according to the existing (or modified) server configuration found in steps 308 and 310, then operation proceeds to step 320. For example, in step 314 the user may click on an "OK" or "Accept" button as described above.

In step 320 a software program may operate to automatically configure the server according to the existing server configuration. Thus, the new server may be automatically configured with minimal user involvement required. Any of various software tools may be used to automatically configure the server according to the existing server configuration.

If the user does not desire to configure the server according to the existing server configuration, then in one embodiment in step 322 a storage configuration wizard may be automatically launched to guide the user through the manual configuration process. Thus, if the user views the existing server configurations that were found in steps 308 and 310, and decides that none of these server configurations are desired to be deployed on the new server, then the user could choose to decline use of any of these existing server configurations. At this point, a storage configuration wizard is executed so that the user can be more actively involved in manually determining the appropriate server configuration for the new server. Alternatively, if steps 308 and 310 fail to identify any possible server configurations which could be applied to the new server, then operation may proceed directly to step 322, and the storage configuration wizard may be executed. In one embodiment, the storage configuration wizard may include a number of steps to guide the user in creating a new storage configuration, followed by a step which prompts the user to register this new storage configuration in the server configuration repository. In another embodiment, in step 322 the user manually configures the server configuration, e.g., according to any prior art methods.

Figure 4:
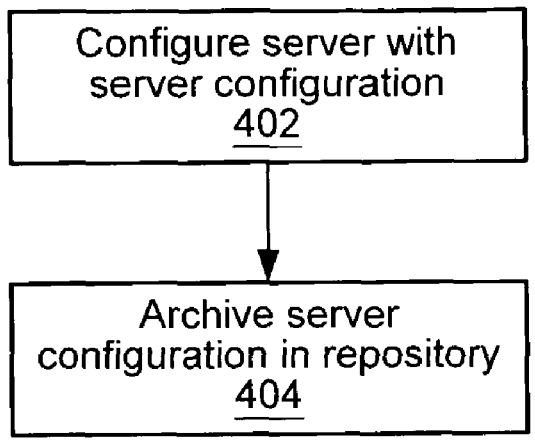
FIG. 4 is a flowchart diagram illustrating archival of storage configurations in a repository.

FIG. 4—Archival of Storage Configurations

FIG. 4 is a flowchart diagram illustrating operation whereby storage configurations of servers may be archived to help form or generate a repository (or database) of server configurations. As described above, this database of server configurations may be searched when new servers are added to the network. Although FIG. 4 is described with respect to storage configurations, the steps of FIG. 4 apply to any of various types of serer configurations as well.

As shown, in one embodiment, in step 402 a user may configure a server with a server configuration. This may be accomplished using a server configuration wizard as discussed above with respect to step 322. Alternatively, the user may configure a server with a server configuration using other methods, such as manually, or by modifying an existing server configuration stored in the server configuration database. In another embodiment, the server configuration may be programmatically created by software.

As shown, in step 404, the server configuration of the server may be archived in a repository or database. Archival or storage of the server configuration may be performed automatically, and possibly invisibly to the user. Alternatively, the user may perform a to registration process to store the server configuration in the repository or database, as described in FIG. 5. The server configuration may be searchable in the repository, e.g., for searching as performed in step 308 described above.

Figure 5:
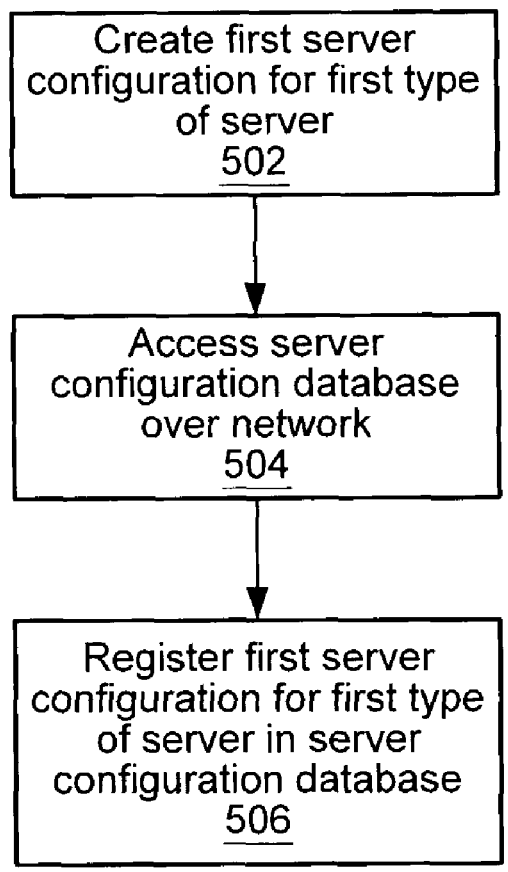
FIG. 5 is a flowchart diagram illustrating registration of storage configurations in a storage configuration database.

FIG. 5—Registration of a Storage Configuration

FIG. 5 is a flowchart diagram illustrating operation where a user configures a server with a server configuration as described in step 402 above, and then the user operates to register this server configuration with a database.

As shown, in step 502 the user may create a first server configuration for a first type of server. The first server configuration may be created in any manner as described above with respect to step 402 of FIG. 4.

In step 504 the user may access the server configuration database over a network, such as the Internet.

In step 506 the user may register the first server configuration with the server configuration database. "Registering" the first server configuration may comprise the user providing information (meta-data) about the first server configuration, or registering may simply comprise storing the first server configuration in the database. After this registration, the first server configuration may be searchable or locatable by software, or may be manually browsed by users.

This embodiment presumes that one or more databases may be used for storing server configurations, and users who create server configurations for a server may operate to register their created server configurations with the database to store these server configurations with the database. For example, a company such as Veritas Software may maintain a server configuration database on its website, and various users, including those employed by Veritas, those associated with Veritas, and possibly users completely unrelated to Veritas, may be able to access this server configuration website and register their created server configuration with the database. In one embodiment, users who register server configurations with the server configuration database may be entitled to free access to all of the server configurations registered on the database. In another embodiment, all users may have access to the server configurations registered on the server configuration database.

Alternate Embodiment

In one embodiment, when the new server is coupled to the network in 302 and is automatically detected in 304, then a wizard program is launched which interacts with the user, e.g., via email or through a GUI element. The wizard program may provide or display a message that a new server has been detected, and may ask the administrator as to whether the new server should be configured as, for example, an Exchange server, a SQL server, a backup server, etc. The administrator may then select the type of server desired. At this point, one or more of steps 306-322 may be performed. For example, the software may then scan for existing server configurations according to the type indicated by the user, and then propose one or more of these existing server configurations to the user as described above.

Various modifications and changes may be made to the invention as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A computer-implemented method for configuring a new server with a server configuration, the method comprising:
using a computer system to perform:
automatically detecting a presence of the new server coupled to a network;
automatically determining one or more attributes of the new server;
automatically determining at least one server configuration for the new server by selecting the at least one server configuration from a plurality of existing server configurations, wherein said automatically determining comprises examining the plurality of existing server configurations to determine if the existing server configurations are usable for configuring the new server, wherein at least a subset of the plurality of existing server configurations have been previously used for server configuration, wherein said examining is based at least in part on the determined one or more attributes of the new server;
wherein the determined at least one server configuration is usable in configuring the new server.

2. The computer-implemented method of claim 1, further comprising using the computer system to perform:
receiving user input specifying configuration of the new server with a first server configuration of the determined at least one server configuration; and
automatically configuring the new server with the first server configuration.

3. The computer-implemented method of claim 1, further comprising using the computer system to perform:
displaying the determined at least one server configuration for the new server on a display;
receiving user input selecting a first server configuration of the at least one server configuration; and
automatically configuring the new server with the first server configuration.

4. The computer-implemented method of claim 3,
wherein said displaying comprises displaying a graphical user interface element comprising the determined at least one server configuration.

5. The computer-implemented method of claim 1, further comprising using the computer system to perform:
generating a notification to a user of the determined at least one server configuration.

6. The computer-implemented method of claim 5,
wherein said generating a notification comprises generating an email to the user.

7. The computer-implemented method of claim 5, further comprising using the computer system to perform:
receiving user input specifying configuration of the new server with a first server configuration of the determined at least one server configuration; and
automatically configuring the new server with the first server configuration.

8. The computer-implemented method of claim 1, further comprising using the computer system to perform:
receiving user input declining configuration of the new server with any of the at least one server configuration; and
automatically initiating a server configuration wizard program in response to said user input declining configuration, wherein the server configuration wizard program is executable to guide the user through a configuration process to generate a server configuration.

9. The computer-implemented method of claim 1, further comprising using the computer system to perform:
maintaining a repository of existing server configurations;
wherein said examining the plurality of existing server configurations comprises examining the repository.

10. The computer-implemented method of claim 9,
wherein the repository is located in a memory medium on the network.

11. The computer-implemented method of claim 9,
wherein the new server is coupled to a first network;
wherein the repository is located in a memory medium on a second network, wherein the second network is coupled to the first network.

12. The computer-implemented method of claim 9, further comprising using the computer system to perform:
configuring a first server with a first server configuration;
storing the first server configuration in a repository;
wherein said automatically determining comprises examining the first server configuration in the repository.

13. The computer-implemented method of claim 9, further comprising using the computer system to perform:
configuring a first server on the network with a first server configuration;
automatically storing the first server configuration in the repository in response to said configuring.

14. The computer-implemented method of claim 1, wherein said one or more attributes comprise available storage in the new server;
wherein the server configuration comprises a storage configuration.

15. The computer-implemented method of claim 1,
wherein the server configuration comprises a backup configuration.

16. A system for configuring a new server with a server configuration, the system comprising:
a computer system, wherein the computer system comprises a processor and a memory medium, wherein at least one memory medium stores one or more existing server configurations;
wherein the memory medium stores a software program that is executable to:
automatically detect a presence of the new server coupled to a network;
automatically determine one or more attributes of the new server;
automatically determine at least one server configuration for the new server by selecting the at least one server configuration from a plurality of existing server configurations, wherein said automatically determining comprises examining the plurality of existing server configurations to determine if the existing server configurations are usable for configuring the new server, wherein at least a subset of the plurality of existing server configurations have been previously used for server configuration, wherein said examining is based at least in part on the determined one or more attributes of the new server;
wherein the determined at least one server configuration is usable in configuring the new server.

17. A non-transitory computer-readable storage medium comprising program instructions that are executable to configure a new server with a server configuration, wherein the program instructions are executable implement:
detect a presence of the new server coupled to a network;
determine one or more attributes of the new server;
determine at least one server configuration for the new server by selecting the at least one server configuration from a plurality of existing server configurations, wherein said determining comprises examining the plurality of existing server configurations to determine if the existing server configurations are usable for configuring the new server, wherein at least a subset of the plurality of existing server configurations have been previously used for server configuration, wherein said examining is based at least in part on the determined one or more attributes of the new server;
wherein the determined at least one server configuration is usable in configuring the new server.

18. The non-transitory computer-readable storage medium of claim 17, wherein the program instructions are further executable to implement:
receiving user input specifying configuration of the new server with a first server configuration of the determined at least one server configuration; and
configuring the new server with the first server configuration.

19. A system for configuring a new server with a server configuration, the system comprising:
means for automatically detecting a presence of the new server coupled to a network;
means for automatically determining one or more attributes of the new server;
means for automatically determining at least one server configuration for the new server by selecting the at least one server configuration from a plurality of existing server configurations, wherein said means for automatically determining operates to examine the plurality of existing server configurations to determine if the existing server configurations are usable for configuring the server, wherein at least a subset of the plurality of existing server configurations have been previously used for server configuration, wherein said examining is based at least in part on the determined one or more attributes of the new server;
wherein the determined at least one server configuration is usable in configuring the new server.

20. The system of claim 19, further comprising:
means for receiving user input specifying configuration of the new server with a first server configuration of the determined at least one server configuration; and
means for automatically configuring the new server with the first server configuration.

21. A computer-implemented method for configuring a new server with a storage configuration, the method comprising:
automatically detecting, by a computer system, a presence of a new server coupled to a network;
automatically determining, by the computer system, one or more attributes of the new server, wherein said one or more attributes include available storage of the new server;
automatically determining, by the computer system, at least one server configuration for the new server by selecting the at least one server configuration from a plurality of existing server configurations, wherein said automatically determining comprises examining the plurality of existing storage configurations to determine if the existing storage configurations are usable for configuring the server, wherein the plurality of existing server configurations are configured for server configuration without modification, wherein said examining is based at least in part on the available storage of the new server;

wherein the determined at least one server configuration is usable in configuring storage of the new server.

22. The method of claim 21, further comprising:
receiving user input specifying configuration of the new server with a first storage configuration of the determined at least one server configuration; and
automatically configuring the new server with the first storage configuration.

23. The method of claim 21, further comprising:
displaying the determined at least one server configuration for the new server on a display;
receiving user input selecting a first storage configuration of the at least one server configuration; and
automatically configuring the new server with the first storage configuration.

24. The method of claim 21, further comprising:
generating a notification to a user of the determined at least one server configuration.

25. The method of claim 21, further comprising:
receiving user input declining configuration of the new server with any of the determined at least one server configuration; and
automatically initiating a storage configuration wizard program, wherein the storage configuration wizard program is executable to guide the user through a configuration process to generate a storage configuration.

26. The method of claim 21,
wherein said examining the plurality of existing storage configurations comprises examining a repository on the network.

27. The method of claim 21,
wherein the new server is coupled to a first network;
wherein said examining the plurality of existing storage configurations comprises examining a repository on a second network.

28. The method of claim 21, further comprising:
configuring a first server with a first storage configuration;
storing the first storage configuration in a repository;
wherein said automatically determining comprises examining the first storage configuration in the repository.

29. A non-transitory computer-readable storage medium comprising program instructions that are executable to:
configure a new server with a server configuration, wherein the program instructions are executable to implement:
detect a presence of the new server coupled to a network;
determine one or more attributes of the new server;
determine at least one server configuration for the new server by selecting the at least one server configuration from a plurality of existing server configurations, wherein said determining comprises examining the plurality of existing server configurations to determine if the existing server configurations are usable for configuring the new server, wherein said examining is based at least in part on the determined one or more attributes of the new server;
wherein the determined at least one server configuration is ace usable in configuring the new server without modification.

30. The non-transitory computer-readable storage medium of claim 29, wherein the program instructions are further executable to:
receive user input specifying configuration of the new server with a first server configuration of the determined at least one server configuration; and
automatically configure the new server with the first server configuration.

31. The non-transitory computer-readable storage medium of claim 29, wherein the program instructions are further executable to:
display the determined at least one server configuration for the new server on a display;
receiving user input selecting a first server configuration of the at least one server configuration; and
automatically configure the new server with the first server configuration.

32. The non-transitory computer-readable storage medium of claim 29, wherein the program instructions are further executable to:
receive user input declining configuration of the new server with any of the at least one server configuration; and
automatically initiate a server configuration wizard program in response to said user input declining configuration, wherein the server configuration wizard program is executable to guide the user through a configuration process to generate a server configuration.

* * * * *

UNITED STATES PATENT AND TRADEMARK OFFICE
CERTIFICATE OF CORRECTION

| | | |
|---|---|---|
| PATENT NO. | : 7,797,404 B1 | Page 1 of 1 |
| APPLICATION NO. | : 10/305651 | |
| DATED | : September 14, 2010 | |
| INVENTOR(S) | : Margaret E. Knight | |

It is certified that error appears in the above-identified patent and that said Letters Patent is hereby corrected as shown below:

Title page item 73 should read:

In the Assignee:

--Assignee is SYMANTEC OPERATING CORPORATION--

Signed and Sealed this

Sixteenth Day of November, 2010

David J. Kappos
*Director of the United States Patent and Trademark Office*